United States Patent [19]

Osborn

[11] 4,422,524
[45] Dec. 27, 1983

[54] VARIABLE SHAPE, FLUID FLOW NOZZLE FOR SOUND SUPPRESSION

[75] Inventor: Melvin N. Osborn, Los Angeles, Calif.

[73] Assignee: Lockheed Corporation, Burbank, Calif.

[21] Appl. No.: 360,294

[22] Filed: Mar. 22, 1982

[51] Int. Cl.³ ............................................. F02K 1/12
[52] U.S. Cl. ............................. 181/215; 239/265.13; 239/265.39; 60/230
[58] Field of Search ........................ 181/213–220; 239/265.13, 265.19, 265.39; 60/230

[56] References Cited

U.S. PATENT DOCUMENTS

| | | | |
|---|---|---|---|
| 2,978,061 | 4/1961 | Keen | 181/215 |
| 3,061,038 | 10/1962 | Lawler et al. | 181/215 |
| 3,133,412 | 5/1964 | Westley | 239/265.39 |
| 3,153,319 | 10/1964 | Young et al. | 239/265.19 |
| 3,351,155 | 11/1967 | Hoch et al. | 181/215 |
| 3,973,731 | 8/1976 | Thayer | 239/265.39 |
| 3,976,160 | 8/1976 | Hoch et al. | 181/215 |

Primary Examiner—Benjamin R. Fuller
Attorney, Agent, or Firm—L. L. Dachs

[57] ABSTRACT

The invention is an aircraft jet engine variable shape, fluid flow nozzle (10) which is adjustable to sound-suppression (take-off) and nozzle open (cruise) modes. In the take-off or sound-suppression mode a plurality of movable flaps (24) are positioned inwardly by actuators (36) so as to form a fluted arrangement with a plurality of webs (13) that define the periphery of the nozzle (10) exit. A plurality of transverse fins (32) on the flaps (24) maintain a seal via a plurality of seals (34) with the web side walls (22). In the nozzle open or cruise mode of operation the guide vanes (26) of the flaps (24) are maintained in alignment with the outer walls of the webs (13) to form a maximum area-circular cross-section nozzle exit.

3 Claims, 5 Drawing Figures

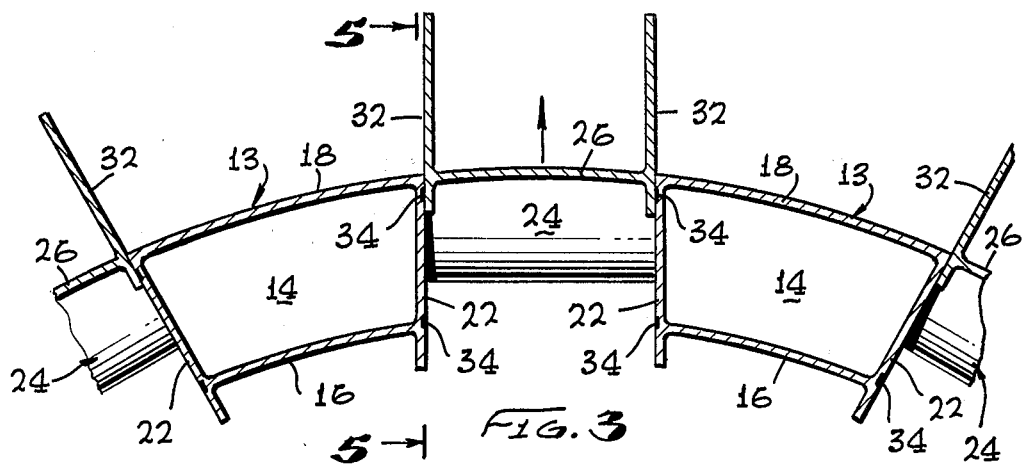
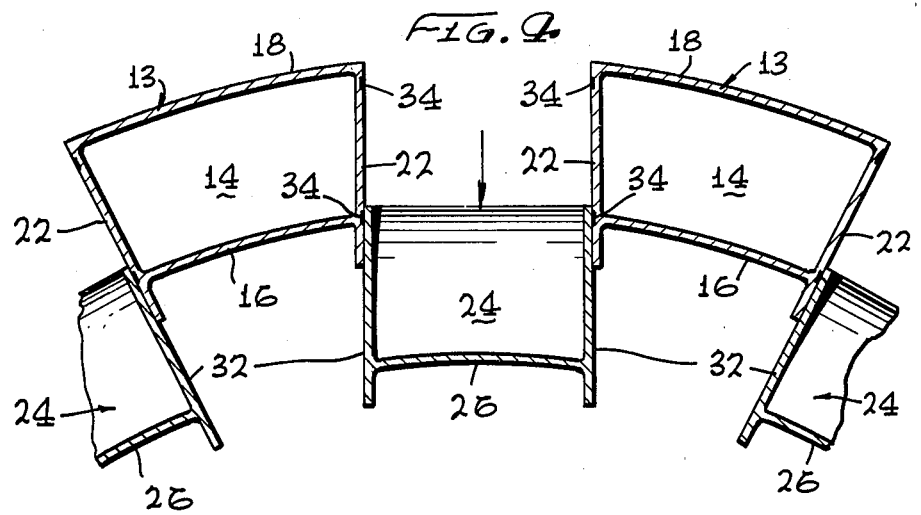
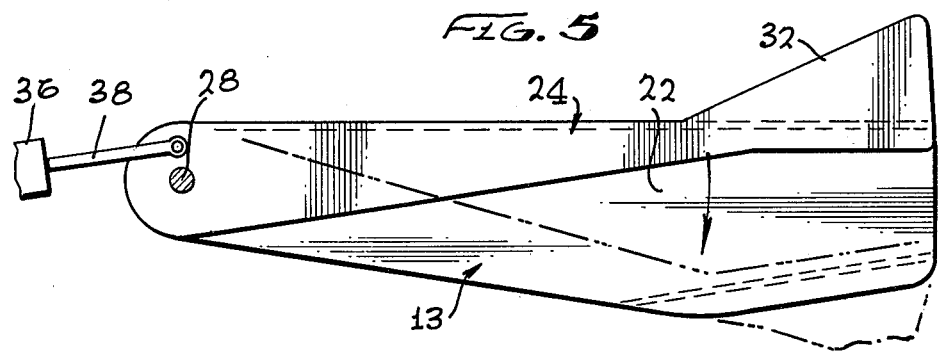

VARIABLE SHAPE, FLUID FLOW NOZZLE FOR SOUND SUPPRESSION

TECHNICAL FIELD

The invention relates generally to the field of jet engine sound suppression and more particularly to nozzles adapted to provide both sound suppression and thrust reversal capabilities.

BACKGROUND ART

There has always been a desire to minimize noise around airports where jet aircraft take off. Typically, when a jet aircraft is taking off and climbing in the vicinity of an airport, its engines are set at full or near full throttle and excessive noise becomes a problem. This problem is not so severe, however, in higher altitude flight when the aircraft is in a cruise mode. The problem thus has been to provide a low-noise nozzle for jet propulsion engines which would achieve maximum sound suppression for take-off and climb operations while not introducing excessive performance losses for efficient operation of the aircraft during cruise conditions.

In designing a nozzle which would solve the aforementioned sound problems, designers are continuously confronted with other considerations also associated with aircraft manufacture and operation. Typical of these is the desire to minimize the production and maintenance costs, the weight and the complexity of the nozzle while simultaneously providing the nozzle with additional useful functions, as for example a thrust reversal capability.

There are several prior art patents which utilize panel or flap type elements in forming jet engine nozzles designed to attenuate the noise emitted by a jet pipe of an aircraft engine. Typical of these are U.S. Pat. Nos. 2,978,061 to Keen, 3,153,319 to Young et al., 3,351,155 to Hoch et al., and 3,976,160 to Hoch et al. The '319 patent discloses provision of a number of teeth (4) distributed around the perimeter of a nozzle exit area. The teeth extend in the direction of the issuing jet and have the effect of modifying the boundary of the jet so that the mixing region between jet and atmosphere is altered. Both fixed and movable teeth are disclosed. In such an arrangement, however, the space between teeth acts as a sort of thrust spoiler. Thus, such openings, whether between fixed or movable elements, are clearly undesirable during certain portions of the flight envelope.

The '155 and '160 patents also represent low efficiency nozzles which are undesirable during at least some portions of the flight envelope. In the case of the '155 patent, which discloses a controlled flap-follower flap design, the flaps (1) and follower flaps (2) offer a very irregular shape profile which of course results in a lower efficiency nozzle. On the other hand, the '160 patent uses a square flap type nozzle which represents a heavy design characterized by large boat-tail angles and therefore high boat-tail drag.

Another somewhat 'dragging' type design for a nozzle is depicted in the '061 patent. In this design, which consists in one embodiment of a plurality of hollow members (11) forming a plurality of spaces (12) containing two series of six flaps (14), two nozzle settings are disclosed. In the FIG. 1 setting, angularly spaced corrugations provide a silenced nozzle, while in the FIG. 2 setting they form a reduced area frustoconical nozzle of circular outlet contour. This particular nozzle is of a somewhat complex and thus expensive design and includes elements of construction such as hollow members (11) which also result in a somewhat 'draggy' design. In addition, the circular outlet contour is of a reduced area, which as will be discussed hereinbelow, is not a preferred arrangement.

An alternative to use of flap type elements can be found in U.S. Pat. No. 3,061,038 to Lawler et al. In this patent, a somewhat heavy, complex and rather inefficient design is disclosed which utilizes a plurality of circumferentially spaced auxiliary nozzle ducts which when extended discharge air rearwardly and outwardly at spaced locations about a nozzle periphery.

Several patents disclose the use of nozzles which provide both noise reduction and thrust reversal capabilities. Exemplary of such patents are U.S. Pat. Nos. 3,133,412 to Westley and 3,973,731 to Thayer. The '731 patent utilizes a flap system arranged in a rectangular exhaust, two of the flaps being adaptable to be placed into a thrust-reversing mode. As noted with respect to the '160 patent, rectangular nozzles and exhaust systems tend to cause undesirable boat-tail drag effects.

The '412 patent on the other hand comprises a segmented frustoconical nozzle as depicted in FIG. 1 thereof wherein each segment is a corrugation in which hinged panels are free to move. Alternate segments have panels (26) which move out between side walls (22). The remaining segments have panels (25) which retract between side walls (21) to provide increased noise suppression without change in nozzle area. FIGS. 1 and 5 show cruise and silencer positions while FIG. 3A shows the nozzle utilized as a thrust reverser. The embodiment depicted in FIG. 5 includes panels (73) and (74) which may be retracted to form a circular nozzle. While the nozzle of the '412 patent provides a means for combining variable noise suppression with a thrust reversing capability, it does not provide a solution to the problem of providing a simple, efficient and economic nozzle whose characteristics include maximum noise suppression in take-off with a maximum of efficiency nozzle at the cruise portions of aircraft flight envelopes, as will be described hereinbelow with reference to the instant invention.

It has long been recognized that the jet from an aircraft engine causes a great deal of noise as it emerges into the atmosphere. If the velocity of the jet is reduced, then the noise created by the engine can be expected to be reduced. However, at take-off, full or nearly full power is required. It has been found, however, that noise suppression can be accomplished at full power through the spreading out of a jet rapidly by increasing the mixing region between the issuing jet and the atmosphere.

One critical aspect of the noise abatement problem is that in the cruise condition, when the air is typically of low density (high altitude), it is most desirable to get maximum thrust by providing a full open and highly efficient nozzle. In such a mode, the need for sound suppression abates and the desire for a maximum efficiency nozzle, i.e., round profile and large area, becomes the desired objective. The problem then is to maximize the take-off (noise abatement) efficiency and cruise efficiency of the nozzle, while minimizing cost, complexity, drag, etc. and providing a thrust reversal option.

In view of the shortcomings of the aforementioned prior art devices, there is a need for an improved jet exhaust nozzle for maximizing take-off sound suppression and cruise efficiency.

It is a primary object then of the instant invention to provide a low-noise nozzle for aircraft jet propulsion engines which is adaptable to achieve both maximum noise suppression during take-off and climb portions of the flight envelope and minimum performance losses during cruise conditions.

It is an additional object of the present invention to provide a low-noise nozzle for jet propulsion engines that is economic to produce and maintain, lightweight and simple.

It is yet another object of the present invention to provide a low-noise nozzle for jet propulsion engines that performs added functions other than noise reduction, as for example providing a thrust reversal capability.

DISCLOSURE OF INVENTION

The invention comprises a novel circular variable area aircraft jet engine nozzle and variable sound suppressor. The shape of the nozzle can be adjusted from a maximum area-circular extended position for efficient cruise operation to a closed-chute shape for sound suppression operation during aircraft take-off.

The nozzle design consists of a first set of spaced outer circumference fixed channel defining webs and alternate channel shaped nozzle exit flaps slidably interposed between the fixed webs. The exit flaps are adapted to be positioned in a nozzle closed (chuted) mode for sound suppression, a nozzle open position (circular) for cruise efficiency, and a projecting flap position for thrust spoiling.

The novel features which are believed to be characteristic of the invention, both as to its organization and its method of operation, together with further objects and advantages thereof, will be better understood from the following description, taken in connection with the accompanying drawings in which a presently preferred embodiment of the invention is illustrated by way of example. It is to be expressly understood, however, that the drawings are for purposes of illustration and description only, and are not intended as a definition of the limits of the invention.

BRIEF DESCRIPTION OF DRAWINGS

FIG. 3 is a fragmentary end view of the nozzle of the present invention showing the nozzle in a supersonic cruise mode;

FIG. 4 is a fragmentary end view of the nozzle of the present invention set in the sound-suppression mode; and FIG. 5 is a cross-sectional view taken on the line 5-5 of FIG. 3.

PREFERRED EMBODIMENT

Figure 2:
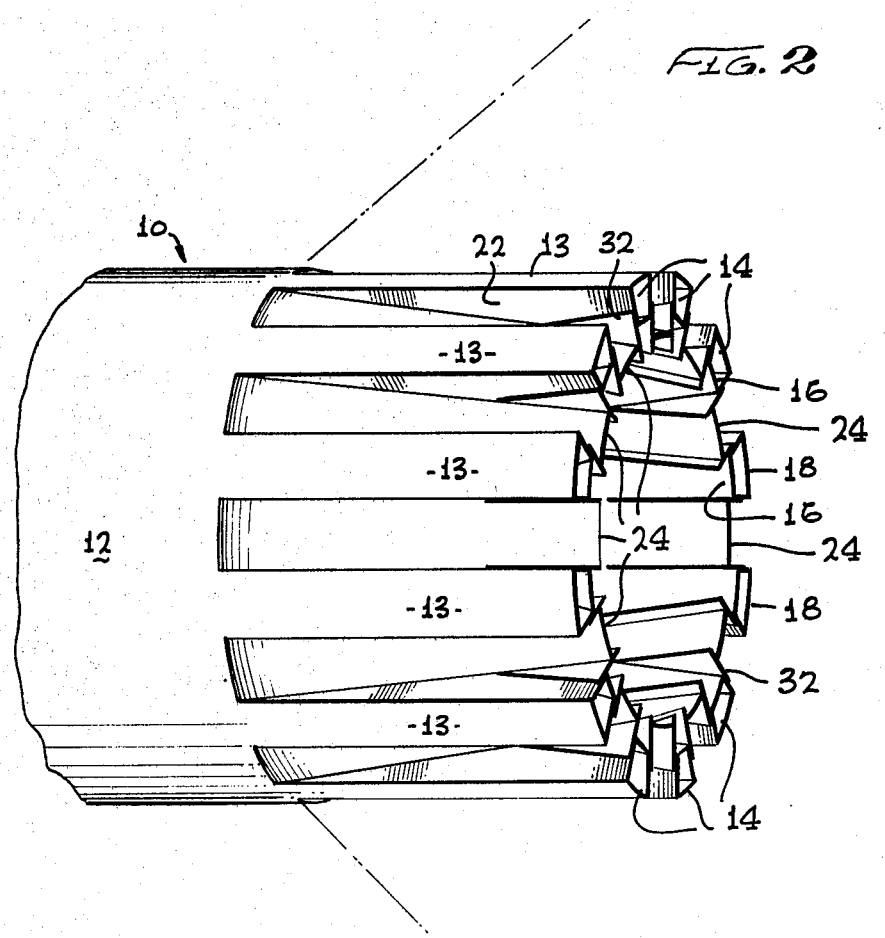
FIG. 2 is a perspective view of the nozzle of the present invention set in a mixing mode, and showing the thrust-reversing mode in phantom.

As disclosed hereinabove, it would be highly desirable to provide a light, non-complex and inexpensive sound-suppression nozzle for the back of aircraft jet engines which would be adjustable so as to provide maximum efficiency sound suppression on take-off, efficient operation at cruise, and thrust spoiling at landing. FIG. 2 of the drawings depicts a variable shape fluid flow nozzle (10) in accordance with the present invention which satisfies the above criteria.

The nozzle (10) is shown in FIG. 2 in its sound-suppression or closed mode which would be the mode utilized during take-off. At such time, the jet engine (12) is at or near full power and the jet gases emanate at extremely high velocity relative to the ambient air (shown by arrows, FIG. 1). The velocity gradient across the boundary of the jet stream has a direct effect on the intensity of noise created by the jet engine at take-off. The nozzle of the present invention is constructed such that when set in the take-off mode, reduces the above velocity gradient and the effects thereof by spreading out the jet and increasing the mixing region between the issuing jet and the ambient air, creating the mixing zone depicted in FIG. 1.

Figure 1:
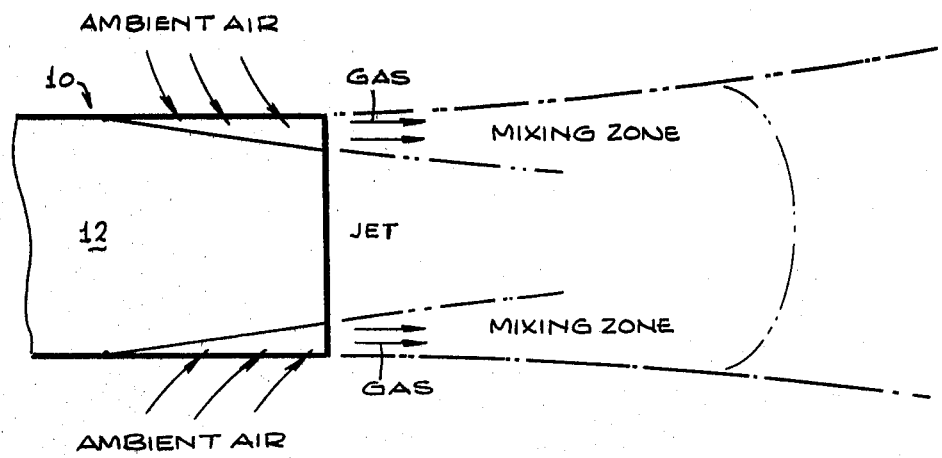
FIG. 1 is a diagrammatic view of a nozzle in accordance with the present invention showing enhanced mixing of air and gases for sound suppression.

Referring now to FIGS. 2 and 4, the nozzle (10) of the present invention is depicted therein and includes a plurality of circumferentially spaced fixed webs (13) having gas passages (14) for exhausting a portion of the gas jet as indicated by arrows in FIG. 1. Each of the passages (14) is formed and defined by an inner wall (16), an outer wall (18) (which defines the outer circumference of the nozzle (10), and two side walls (22). The inner wall (16) serves the dual purpose of a gas guide vane and a web stabilizing member.

Positioned between each of the webs (13) is a movable flap (24) which comprises a gas guide vane (26) pivotally connected at one end to the engine (12) by any suitable means, such as a rod (28) (FIG. 5). The other end of the flap (24) terminates in two wedge-shaped side wall fins (32) which are generally transverse to the guide vanes (26). The side wall fins (32) function to maintain a seal between the flaps (24) and the webs (13) via seals (34), which may be of any known type. As can be seen by reference to FIGS. 3 and 4, the sealing function of the side wall fins (32) is essential when the nozzle (10) is in its closed or fluted mode, that is, during the take-off sound-suppression mode depicted in FIG. 4.

It is a key element of the present invention that the nozzle (10) is characterized by a full rounded cross-section as depicted in FIG. 3 when the aircraft is in the cruise portion of the flight envelope. At such time, a plurality of actuators (36), one shown in FIG. 5, pull the flaps (24) to the nozzle open mode via the actuator rod (38). Of course, any suitable arrangement to move the flaps (24) would be acceptable, and actuator (36) is depicted merely by way of example. In the open or cruise setting, the nozzle (10) of the present invention operates at maximum area are efficiency with little or no drag other than the minimum amount associated with the side wall fins (32).

When the actuator rod (38) is extended, the flaps (24) form the nozzle closed mode shown in FIGS. 4 and 5 (dotted) and bring about the desired sound suppression via enhanced mixing, as shown in FIG. 1. In the closed or sound-suppression mode, rather than having a circular outlet contour the nozzle presents rather a fluted or corrugated orifice configuration. Thus ambient air is permitted to travel between the side walls (22) of the webs (13) to admix with the emanating jet of engine gases.

When it is desired to operate the nozzle (10) as a spoiler, the flaps (24) can be moved via the actuator (36) to positions projecting outside the periphery of the nozzle, as for example is indicated by phantom lines (42) in FIG. 2.

It is apparent that there has been provided with this invention a novel Variable Shape, Fluid Flow Nozzle For Sound Suppression which fully satisfies the objects, means and advantages set forth hereinbefore. While the invention has been described in combination with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

I claim:

1. A variable shape and area fluid flow nozzle for aircraft jet engines, said nozzle having a longitudinal axis and being adapted for use as a sound-suppression and cruise nozzle, comprising:
  a plurality of longitudinally extending peripherally spaced web elements, each of said web elements comprising an inner wall, two side walls, and an outer wall, said walls defining a passage for a portion of the gas jet emanating from said engine, and said outer wall defining a portion of the outer periphery of said nozzle;
  a plurality of flaps individually and alternately interposed between pairs of said web elements and longitudinally extending from an upstream end of said nozzle to the downstream exit end of said nozzle, each of said flaps comprising a longitudinally extending gas guide vane defining the remaining portions of the outer periphery of said nozzle, each of said flaps further comprising a pair of side wall fins attached at the downstream end of and generally transverse to opposite edges of said vanes, said vanes and said fins being movable between and forming a seal with said web side walls; and
  means for providing movement of said flaps from a sound-suppression/nozzle closed mode wherein said nozzle periphery is characterized by a fluted downstream cross-section and said vanes, fins and side walls provide passages for ambient air to mix into said jet immediately downstream of said nozzle exit, and a cruise/nozzle open position wherein said web outer walls and said vanes form an enlarged area-circular nozzle exit for said engine jet.

2. A nozzle as in claim 1, wherein said side wall fins comprise two generally triangular fins, one on each side and integral with said vanes.

3. A nozzle as in claim 1 or 2 wherein said nozzle is additionally adapted for use as a thrust reverser, said movable flaps being adjustable to a position outside said nozzle periphery whereby the longitudinal axis of said flaps forms a large angle with said nozzle longitudinal axis.

* * * * *